UNITED STATES PATENT OFFICE.

ARTHUR P. TAYLOR AND JAMES DONALD RUNYAN, OF CINCINNATI, OHIO, ASSIGNORS TO THE CHARLES TAYLOR SONS COMPANY, OF CINCINNATI, OHIO, A CORPORATION OF OHIO.

MANUFACTURE OF PLASTIC PRODUCTS.

1,212,847.     Specification of Letters Patent.     Patented Jan. 16, 1917.

No Drawing. Original application filed December 8, 1915, Serial No. 65,784. Divided and this application filed July 11, 1916. Serial No. 108,707.

*To all whom it may concern:*

Be it known that we, ARTHUR P. TAYLOR and JAMES DONALD RUNYAN, both citizens of the United States, residing at Cincinnati, in the county of Hamilton and State of Ohio, have invented a new and useful Improvement in the Manufacture of Plastic Products, of which the following is a full, clear, and exact description.

Our invention has relation to the manufacture of refractory products, and is designed to provide means whereby a greatly superior product of this class may be obtained.

Our invention has particular relation to the manufacture of refractory products which consist mainly of flint clay having a suitable binder, such a kaolin or kaolins. One of the main difficulties heretofore experienced in the manufacture of this class of products is that the flint clays, as mined, contain varying amounts of impurities, namely, iron salts, such as the ferric and ferrous oxids, and when these impurities are present in bricks, the refractoriness thereof is diminished, they are readily attacked by the slags, and are caused to deteriorate rapidly. Heretofore, in so far as we have been aware, there has been no satisfactory method of determining the presence and amount of these impurities in the raw clay. In a shipment of clay received by a brick manufacturer, the amount of salts present may be so small as not to seriously affect the quality of the brick produced, while in another shipment, the impurities may be present to a very much greater extent and in injurious quantities. As a result, the bricks produced even from clays taken from the same mine or banks vary widely in their refractory qualities. These impurities occur largely in the form of pockets, and we have ascertained that if flint clay is calcined before being used, the impurities present result in such a discoloration of the calcined product as enables their presence to be readily detected. When so detected, these portions of the clay can be readily separated out by manual operations. That is to say, the discolored portions of the clay can be picked out by hand.

Our present invention therefore consists of calcining the raw flint clay and then taking out and removing therefrom the impurities made visible by the calcining operations, before mixing the clay with its bonding material or materials.

The present application is a division of our pending application, Serial No. 65,784, filed December 8, 1915.

After the flint clay has been calcined and the impurities separated therefrom, as described, we prefer to use the calcined clay in the manner described in our said application, and which consists in mixing therewith a bonding material composed of two different kaolins of different refractory properties, one of the kaolins having a relatively high refractory quality and the other kaolin being of a relatively high plastic character. The desired shape is then given to the material and the products are fired in the usual manner.

Our invention provides a very greatly improved brick, due to the elimination of the impurities therefrom. This elimination enables the product of the brick-making plant to be rendered substantially uniform in character, notwithstanding wide variations in the character of the flint clay obtained.

We claim:

1. In the manufacture of refractory products, the improvement which consists in calcining flint clay, and thereby rendering visible the impurities contained therein, and then separating out such impurities before using the clay, substantially as described.

2. In the manufacture of refractory products, the method which consists in treating raw flint clay to effect a discoloration of the impurities contained therein, and then removing the impurities, substantially as described.

In testimony whereof, we have hereunto set our hands.

ARTHUR P. TAYLOR.
JAMES DONALD RUNYAN.

Witnesses:
  J. H. COULTER,
  H. HERIER.